F. SCHOTT.
PROCESS OF UTILIZING THE WASTE GASES OF COMBUSTION FROM PORTLAND CEMENT, LIME, AND OTHER KILNS.
APPLICATION FILED DEC. 30, 1912.
1,064,550.
Patented June 10, 1913.
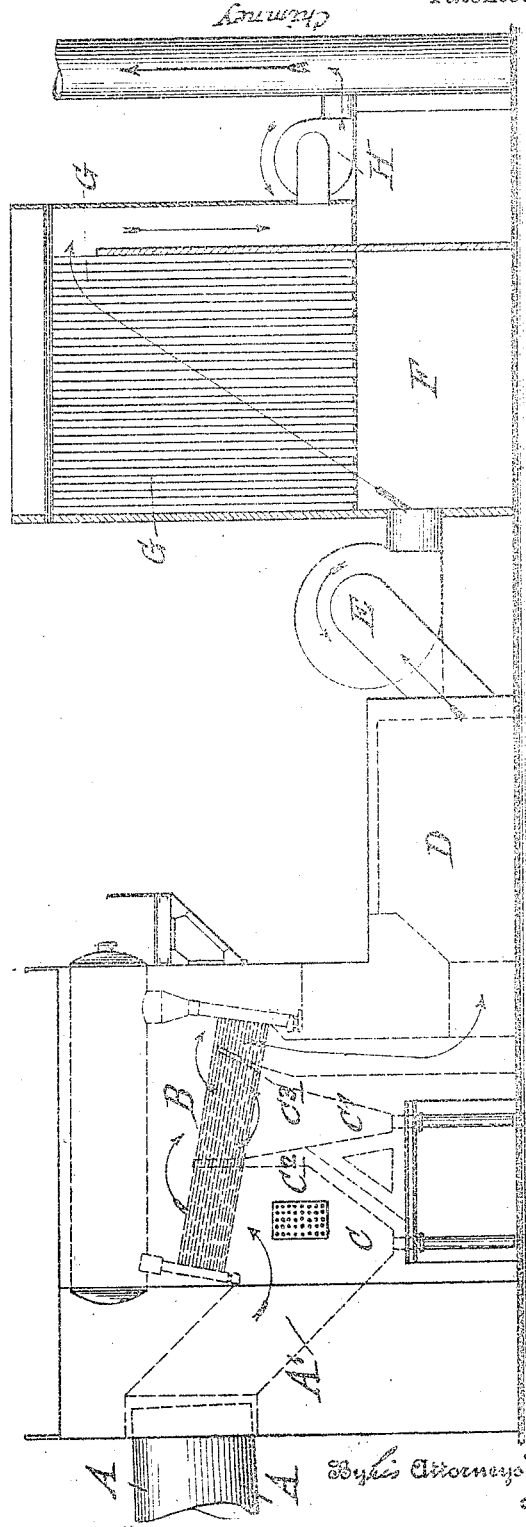

UNITED STATES PATENT OFFICE.

FRIEDRICH SCHOTT, OF HEIDELBERG, GERMANY.

PROCESS OF UTILIZING THE WASTE GASES OF COMBUSTION FROM PORTLAND-CEMENT, LIME, AND OTHER KILNS.

1,064,000.

Specification of Letters Patent. Patented June 10, 1913.

Application filed December 30, 1912. Serial No. 739,283.

*To all whom it may concern:*

Be it known that I, FRIEDRICH SCHOTT, a citizen of the Empire of Germany, residing in Heidelberg, Grand Duchy of Baden, in said Empire, have invented certain new and useful Improvements in Processes of Utilizing the Waste Gases of Combustion from Portland-Cement, Lime, and other Kilns, of which the following is a specification.

This invention relates to an improved process of utilizing the waste-gases of combustion from Portland cement, lime and other kilns for the production of potassium and ammonia-salts to be used for fertilizers.

In the burning of Portland cement, lime and mixed alkali-containing silicate-rocks, the products of combustion were heretofore drawn off at a temperature of 400 to 700° C. directly into the chimney. Owing to the considerable generation of dust in these kilns, dust-collecting chambers were introduced between the kiln and the chimney, while also steam-boilers were introduced adjacent to the kiln for the utilization of the high temperatures of the products of combustion, whereby the heat of the products of combustion was reduced and the same conducted at a temperature of from 200 to 250° C. to the chimney, which temperature is the one required for the natural draft of the chimney. It was found that, together with the cement-dust carried along by the products of combustion, potassium-salts were deposited in the settling chambers, and it was therefore proposed to utilize this potassium-containing dust as a fertilizer. It was known, however, that potassium-salts were contained in the dust generated in the well-known ring-kilns formerly employed, which salts were collected in the draft-flues leading to the chimney, but the quantity of the potassium-salts was found not to be sufficient for working up the dust into a good fertilizer.

The object of this invention therefore is to separate the potassium-carrying dust coming from the rotary kiln, also the ammonia-salts, which are obtained by the burning of the Portland cement, from the fuel which is injected in the form of finely-ground coal-dust into the kiln, and which, due to the combustion, are split into nitrogen and hydrogen and which are conducted in the form of ammoniacal gases together with the carbon dioxid generated from the lime and the dust, into the chimney. I have discovered that when these gases are sufficiently cooled, the ammonia-salts are solidified and can be collected in the form of dust, together with the potassium-salts contained in the dust, and utilized as a valuable fertilizer-material.

The invention consists therefore in a process hereinafter described for obtaining the potassium and ammonia salts from the waste-gases of Portland cement, lime and other kilns. For this purpose the apparatus shown in the accompanying drawing is employed, which consists of the rotary kiln A in which the Portland cement, lime or other alkali-bearing silicate-rocks are burned. A steam-boiler B, supported at about the level of the kiln, is connected by a downwardly-inclined flue $A^1$ with the space below the water-tubes of the steam-boiler. The coarser particles of dust are collected in hopper-shaped receptacles C, $C^1$, which are formed by baffle-plates $C^2$, $C^3$ that extend in upward direction at both sides of the system of water-tubes. The space between the water-tubes and upper ends of the baffle-plates is closed by fire-brick insertions. The products of combustion, from which the coarser dust has been separated, are then drawn together with the fine particles of dust by means of a ventilator E through a boiler feed-water heater D, and are then forced through a filtering chamber F. The gases of combustion, which have given up the greater part of their heat in their passage through the water-flues of the steam-generator, are cooled in the economizer D to a temperature below 100° C., while in the filtering chamber the fine dust and the potassium and ammonia salts, which have become solidified in consequence of the cooling action of the economizer, are retained by filtering sheets G. The purified gases, together with the heavier dioxid gas contained therein, are sucked off by a second ventilator H and then conducted into the atmosphere through the chimney.

Separate applications for Letters Patent for the apparatus employed, both for utilizing the heat of the kiln for the generation of steam and for utilizing the waste-products of combustion, were filed by me on the same day herewith, Ser. Nos. 739,284 and 739,285.

The process can also be used for kilns in which mixed alkali-containing silicate-rocks are burned, for collecting the potassium and ammonia salts liberated by the same.

I claim:

1. The process herein described of utilizing the waste-gases of combustion from Portland cement, lime and other kilns, which consists in separating the heavier particles of dust from the gases of combustion, cooling the gases for changing the potassium and ammonia salts into solidified form, and then separating the finer particles of dust together with the potassium and ammonia salts by filtration from the purified gases of combustion.

2. The process herein described of utilizing the waste-gases of combustion from Portland cement, lime and other kilns, which consists in separating the coarser particles of dust from the gases of combustion, reducing the temperature of the gases and changing the potassium and ammonia salts contained therein into solidified form, separating the finer particles of dust together with the potassium and ammonia salts by filtration, and drawing off the remaining gases by suction into the atmosphere.

In testimony, that I claim the foregoing as my invention, I have signed my name in presence of two subscribing witnesses.

FRIEDRICH SCHOTT.

Witnesses:
PAUL ECK,
JOSEPH PFEIFFER.